United States Patent
Yamada

(10) Patent No.: US 8,667,008 B2
(45) Date of Patent: Mar. 4, 2014

(54) SEARCH REQUEST CONTROL APPARATUS AND SEARCH REQUEST CONTROL METHOD

(75) Inventor: Kiichi Yamada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 172 days.

(21) Appl. No.: 13/299,770

(22) Filed: Nov. 18, 2011

(65) Prior Publication Data

US 2012/0197938 A1    Aug. 2, 2012

(30) Foreign Application Priority Data

Jan. 28, 2011    (JP) ................................. 2011-017223

(51) Int. Cl.
*G06F 17/00*    (2006.01)

(52) U.S. Cl.
USPC .......................................... 707/769; 707/770

(58) Field of Classification Search
USPC .................. 707/705–721, 758–766, 769–782
See application file for complete search history.

(56) References Cited

U.S. PATENT DOCUMENTS

| | | | |
|---|---|---|---|
| 6,763,393 B2 | 7/2004 | Hirosawa et al. | |
| 7,984,044 B2 | 7/2011 | Iwayama et al. | |
| 2002/0010706 A1 * | 1/2002 | Brickell et al. | 707/200 |
| 2004/0034591 A1 * | 2/2004 | Waelbroeck et al. | 705/37 |
| 2006/0129518 A1 * | 6/2006 | Andreev et al. | 707/1 |
| 2009/0292677 A1 * | 11/2009 | Kim | 707/3 |
| 2010/0312762 A1 * | 12/2010 | Yan et al. | 707/716 |

FOREIGN PATENT DOCUMENTS

| | | |
|---|---|---|
| JP | 11-232302 A | 8/1999 |
| JP | 2007-241516 A | 9/2007 |
| JP | 2009-251686 A | 10/2009 |

* cited by examiner

*Primary Examiner* — Wilson Lee
(74) *Attorney, Agent, or Firm* — Fujitsu Patent Center

(57) ABSTRACT

A search request control apparatus includes a processor to execute a process. The process includes splitting a search request set, which contains a plurality of search requests acquired in a predetermined period, into subsets in accordance with a degree of overlap of data searched by each of the search requests, calculating an average response of the search requests contained in the search request set in accordance with a processing order of the subsets that are obtained through the splitting, and processing collectively in accordance with the processing order, search requests contained in a plurality of subsets having a minimum average response calculated.

6 Claims, 16 Drawing Sheets

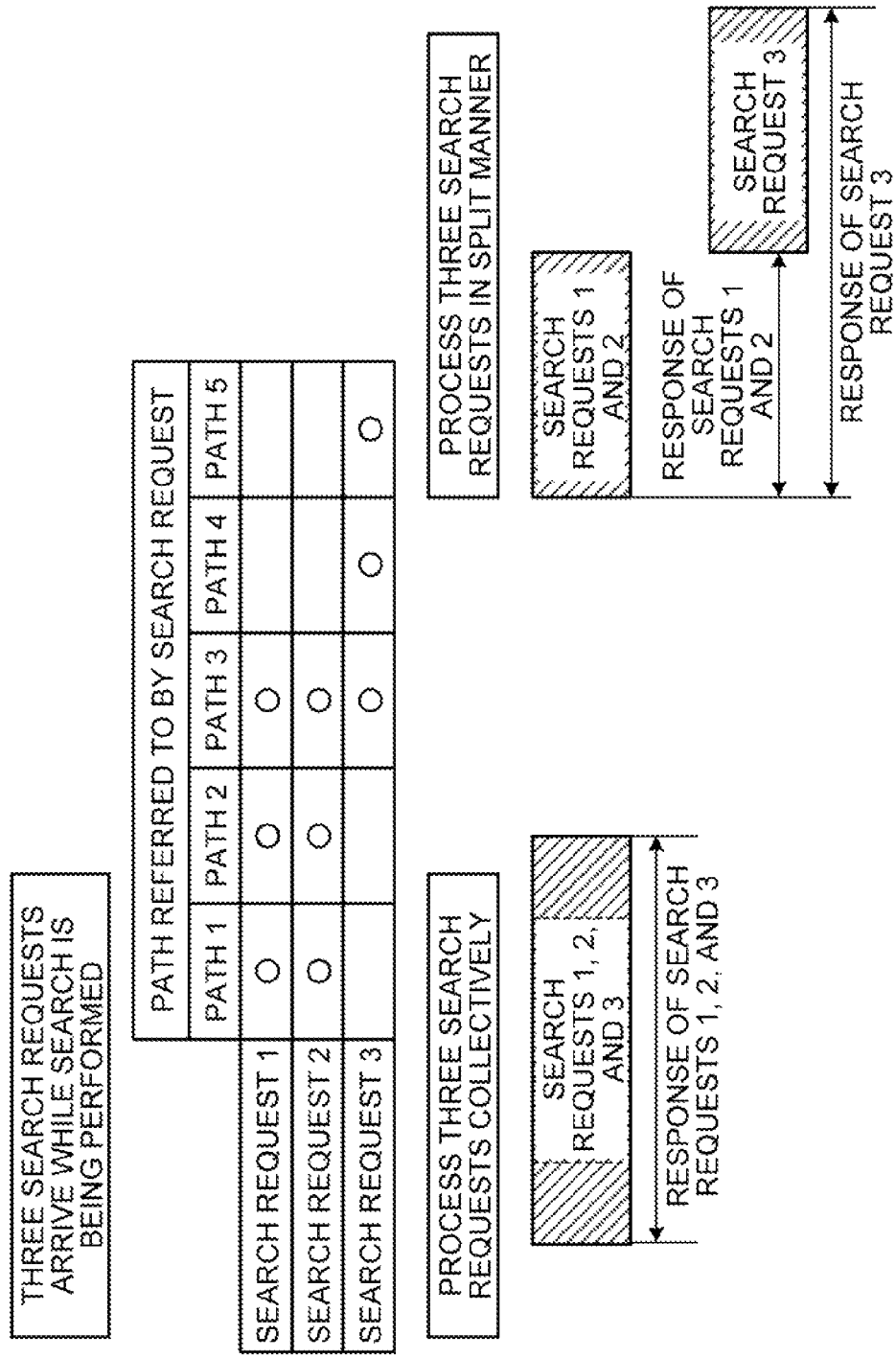

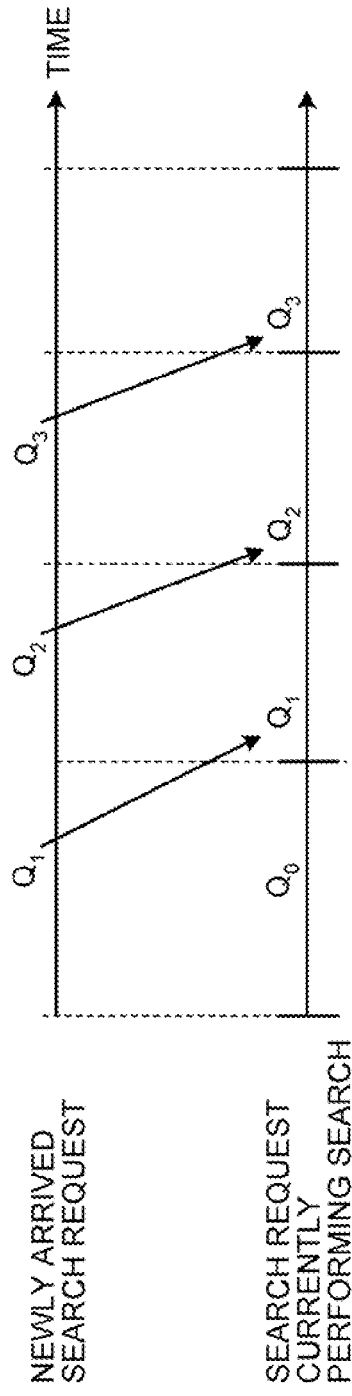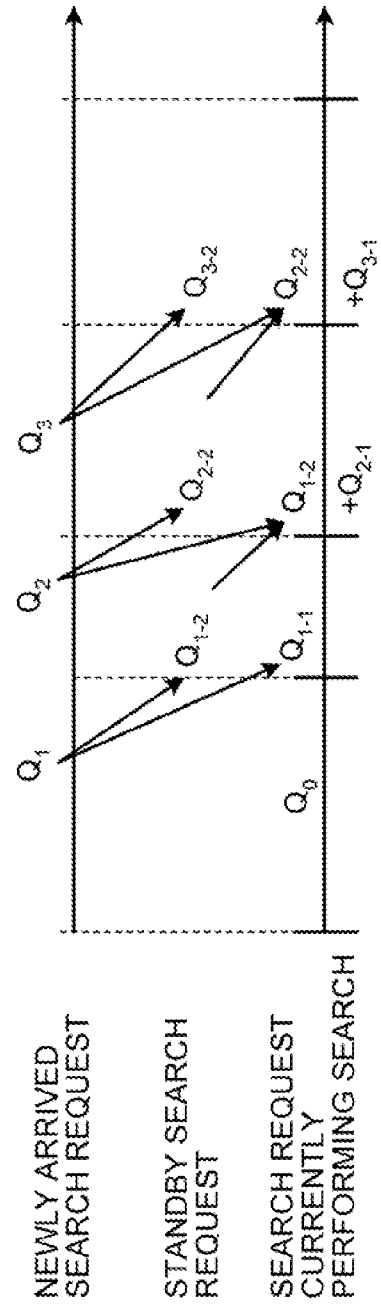

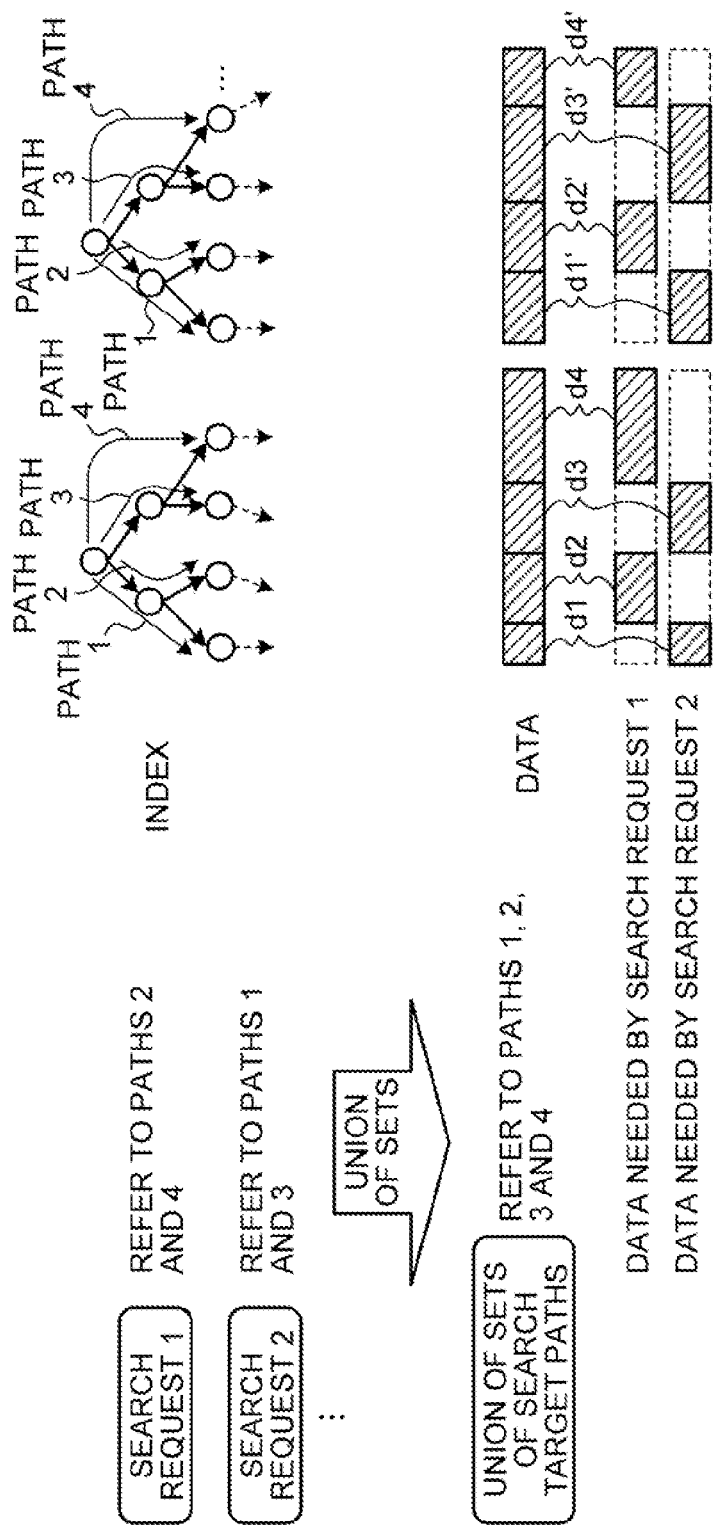

SEARCH REQUEST CONTROL APPARATUS AND SEARCH REQUEST CONTROL METHOD

CROSS-REFERENCE TO RELATED APPLICATION

This application is based upon and claims the benefit of priority of the prior Japanese Patent Application No. 2011-017223, filed on Jan. 28, 2011, the entire contents of which are incorporated herein by reference.

FIELD

The embodiments discussed herein are directed to a search request control apparatus and a search request control method.

BACKGROUND

In recent years, high-traffic technology is sometimes used for searching the data stored in database systems (see, for example, Japanese Laid-open Patent Publication No. 2007-241516). The high-traffic technology realizes reduction in search time even when search requests are simultaneously transmitted. The high-traffic technology mentioned here is a technology for creating a single automaton from a plurality of search requests and then matching, by using the created automaton, the search requests with target data of the search. FIG. 13 is a schematic diagram illustrating an example of a data search performed using high-traffic technology.

As illustrated in FIG. 13, for example, a database system integrates search requests 1 to 4, which are simultaneously transmitted. The database system then searches collectively search target data for data corresponding to the integrated search request. The database system allocates the respective search results to the search requests 1 to 4. Accordingly, even when there is a high degree of overlap in the search requests simultaneously transmitted, the search request data are searched collectively; therefore, the time taken to search for the data (hereinafter, referred to as a "search time") can be estimated (For related technology, see Japanese Laid-open Patent Publication No. 11-232302, for example).

Furthermore, an index technology is used as a technology for reducing the search time of data. The index technology is a technology which allows for directly selecting (searching) a record having a predetermined value in a column of a table in a relational database, and for directly searching data indicated by a specific path from data that has a predetermined structure, such as an XML document. FIG. 14 is a schematic diagram illustrating an example of a data search using the index technology.

As illustrated in FIG. 14, the search request 1 searches for data d2 and d4 (d2' and d4') indicated by an index path 2 and an index path 4, whereas the search request 2 searches for data d3 and d4 (d3' and d4') indicated by an index path 3 and the index path 4. Accordingly, the search request 1 and the search request 2 search a minimum required number of data without searching all of the data, thus reducing the data search time.

However, data searched according to one search request may be searched by another search request. In other words, searched data may overlap. In the example illustrated in FIG. 14, the data d4 (d4') indicated by the path 4 is searched by both the search request 1 and the search request 2 as indicated by D1 (D1'). Because the overlapped data d4 (d4') is searched twice, the data search efficiency is reduced due to redundant search.

To further reduce the data search time, a technology that adapts the index technology for high-traffic technology may be employed. This technology integrates search requests that are simultaneously transmitted, creates a union of sets of index paths of the integrated search requests, and collectively searches data indicated by the index paths belonging to the created union. FIG. 15 is a schematic diagram illustrating a technology that uses the index technology for high-traffic technology.

As illustrated in FIG. 15, the search request 1 searches for data indicated by the index path 2 and the index path 4, whereas the search request 2 searches for data indicated by the index path 3 and the index path 4. In such a case, this technology creates the union of sets of index paths 2, 3, and 4 for the search requests 1 and the search request 2, and collectively searches for data d2, d3, and d4 (d2', d3', and d4') indicated by the paths belonging to the created union. Accordingly, even when data searched by one search request is also searched by another search request, this data is searched only once as indicated by D2 (D2') in FIG. 15, thus improving the data search efficiency.

Furthermore, there is a technology for allocating search requests transmitted almost simultaneously, in other words, allocating search expressions, to a plurality of search expression sets in accordance with predicted search speed of each search expression; sequentially performing a search based on the search expression sets in a descending order of the predicted search speed; and thus performing a search collectively based on the search expressions in a corresponding search expression set (see Japanese Laid-open Patent Publication No. 2009-251686, for example).

However, when adapting the index technology for high-traffic technology, there is a problem in that the data search efficiency is not always improved. Specifically, if a volume of overlapped data searched by search requests that are simultaneously transmitted is small, the effect of searching for overlapped data only once is trivial, thus, the data search efficiency may not be improved.

In the following, the problem of lack of improvement in the data search efficiency will be more specifically described with reference to FIG. 16. FIG. 16 is a schematic diagram illustrating a problem that arises when the index technology is adapted for high-traffic technology. As illustrated in FIG. 16, the search request 1 searches for data indicated by the index path 2 and the index path 4, whereas the search request 2 searches for data indicated by the index path 1 and the index path 3. In such a case, the technology creates the union of sets of the index paths 1, 2, 3, and 4 for the search requests 1 and 2 and collectively searches for data d1 to d4 (d1' to d4') indicated by the index paths belonging to the created union of sets. However, because there is no overlapped data searched by the search request 1 and the search request 2, the effect of the searching for the overlapped data only once is reduced. Accordingly, the data search efficiency is not improved.

Furthermore, even if a technology that sequentially searches for search expression sets in an order for which the search speed is predicted to be high, when the data searched by the search expressions contained in the search expression sets do not overlap, the data search efficiency is not improved.

The problem described above also occurs when searching for data stored in database systems, as well as when searching for data using a search engine on the Internet or the like.

SUMMARY

According to an aspect of an embodiment of the invention, a search request control apparatus includes a processor to execute a process, the process including splitting a search request set, which contains a plurality of search requests acquired in a predetermined period, into subsets in accordance with a degree of overlap of data searched by each of the search requests, calculating an average response of the search requests contained in the search request set in accordance with a processing order of the subsets that are obtained through the splitting, and processing collectively in accordance with the processing order, search requests contained in a plurality of subsets having a minimum average response calculated.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a schematic diagram illustrating an improvement of an average response by splitting;

FIGS. 3A and 3B are schematic diagrams illustrating a time chart for controlling search requests;

FIG. 16 is a schematic diagram illustrating a problem that arises when the index technology is adapted for the high-traffic technology.

DESCRIPTION OF EMBODIMENTS

Preferred embodiments of the present invention will be explained with reference to accompanying drawings. In the embodiments described below, a description is given of a case in which the present invention is adapted as a search request control apparatus that controls search requests for data in a database system. However, the present invention is not limited to the embodiments described below. For example, the present invention may also be adapted as a search engine in a system in which, for example, the Internet or an intranet is used. Furthermore, in the following embodiments, a description is given of a case in which the index technology is adapted for high-traffic technology.

[a] First Embodiment

Figure 1:
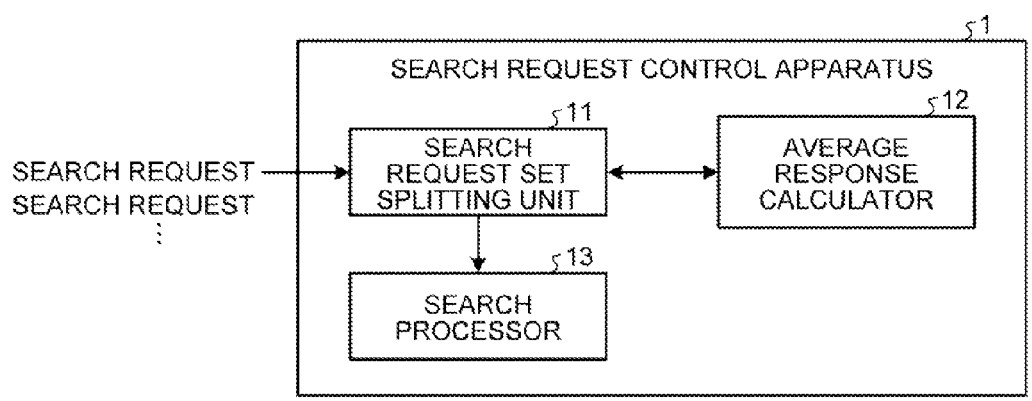
FIG. 1 is a functional block diagram illustrating a configuration of a search request control apparatus according to a first embodiment.

FIG. 1 is a functional block diagram illustrating a configuration of a search request control apparatus according to a first embodiment. As illustrated in FIG. 1, a search request control apparatus 1 includes a search request set splitting unit 11, an average response calculator 12, and a search processor 13.

The search request set splitting unit 11 splits a search request set that includes search requests acquired in a predetermined time period into more than one subset in accordance with the degree of overlap of data searched by the search requests. The predetermined time period mentioned here means a time period during which the search requests are transmitted approximately simultaneously; however, the predetermined time period may also be a time period, search requests transmitted during which can be processed collectively without problem.

In accordance with the processing order of subsets that are split by the search request set splitting unit 11, the average response calculator 12 calculates an average response of search requests contained in a search request set.

For a subset having a minimum average response calculated by the average response calculator 12, the search processor 13 collectively processes the search requests contained in the subset in accordance with the processing order.

In this way, the degree of overlap of data searched by search requests is used for splitting a search request set into subsets, subset being a unit of collective processing. Thus the search request control apparatus 1 enhances the locality of data searched by the search requests in the subset, thereby improving the data search efficiency. Furthermore, because the search request control apparatus 1 splits the search request set into subsets in order to further reduce the average response of search requests, the average response of the search requests can be improved by processing each of the split subsets.

In the following, an improvement of the average response due to splitting a search request set into subsets will be described with reference to FIG. 2. FIG. 2 is a schematic diagram illustrating an improvement of an average response due to splitting. In an example illustrated in FIG. 2, a description is given with the assumption that three search requests 1 to 3 arrive almost simultaneously. As illustrated in FIG. 2, the search requests 1 and 2 search for data indicated by index paths 1, 2, and 3, whereas the search request 3 searches for data indicated by index paths 3, 4, and 5. The sizes of all pieces of data indicated by the paths 1 to 5 are the same. For the description, it is assumed that the size of data indicated by the paths 1 to 5, i.e., the size of the search target data is "S", and that the search time for each unit size of search target data is "k".

First, the average response for collectively processing the search requests 1 to 3 is calculated. Because the search requests 1 to 3 are processed collectively, the average response of the search requests 1 to 3 corresponds to the time taken to collectively search for data indicated by the paths 1 to 5. Accordingly, the average response of the search requests is given by Expression (1) below:

$$\text{average response of search requests} = k \times S \quad (1)$$

Then, an average response for processing the search requests 1 to 3 in a split manner is calculated. The search request set splitting unit 11 splits a search request set containing the search requests 1 to 3, which are substantially simultaneously acquired, into subsets in accordance with the degree of overlap of data searched by the search requests. Here, it is assumed that the search request set splitting unit 11 allocates the search requests 1 and 2 that have overlapped data indicated by the paths 1 to 3 to the same subset. Furthermore, the search request set splitting unit 11 allocates the search request 3, which refers to the path 3 that is also referred to by both the search requests 1 and 2 and which refers to the paths 4 and 5 that are not referred to by the search requests 1 and 2, to a subset that is different from the subset of the search requests 1 and 2.

Then, in accordance with the processing order of two subsets that are split by the search request set splitting unit 11, the average response calculator 12 calculates the average response of the search requests contained in the search request set. Here, the average response calculator 12 calculates the average response of the search requests contained in the search request set that contains two subsets by processing a subset that contains the search requests 1 and 2 firstly and processing a subset that contains the search request 3 secondly. Accordingly, the average response of the search requests is given by Expression (2) below:

$$\text{average response of search requests} = \{2\times(k\times S\times 3/5) + 1\times(k\times S\times 3/5 + k\times S\times 3/5)\}/3 = k\times S\times 4/5 \quad (2)$$

Accordingly, comparing Expression (1) with Expression (2) reveals that, if the search requests 1 to 3 are processed in a split manner, the average response of the search requests is improved by 20% when compared with a case in which the search requests 1 to 3 are processed collectively.

A time chart of search requests that are processed in a split manner will be described with reference to FIGS. 3A and 3B. FIGS. 3A and 3B are schematic diagrams illustrating a time chart for controlling search requests. FIG. 3A illustrates a time chart of a case in which search requests are not split. FIG. 3B illustrates a time chart of a case in which search requests are split. It is assumed that symbols $Q_0$ to $Q_3$ illustrated in FIGS. 3A and 3B are search request sets containing search requests that arrive almost simultaneously. Furthermore, it is assumed that $Q_{1-1}$, $Q_{1-2}$ are subsets obtained by splitting a search request set $Q_1$, and that $Q_{2-1}$ and $Q_{2-2}$ are subsets obtained by splitting a search request set $Q_2$. Furthermore, it is assumed that $Q_{3-1}$ and $Q_{3-2}$ are subsets obtained by splitting a search request set $Q_3$.

As illustrated in FIG. 3A, if the search requests are not split, for example, a newly arrived search request set $Q_1$ is subjected to a search process after the search process is performed on the search request set $Q_0$ that is currently being subjected to the search process.

In contrast, as illustrated in FIG. 3B, if the search requests are split, a subset $Q_{1-1}$ contained in the newly arrived search request set $Q_1$ is subjected to the search process after the search process is performed on the search request set $Q_0$ that is currently being subjected to the search process. At this time, the subset $Q_{1-2}$ contained in the search request set $Q_1$ waits until the search process performed on the subset $Q_{1-1}$ ends. Then, the waiting subset $Q_{1-2}$ is merged with a subset $Q_{2-1}$ contained in the search request set $Q_2$ that arrives shortly after the search request set $Q_1$ arrives and is subjected to the search process after the search process is performed on the subset $Q_{1-1}$.

[b] Second Embodiment

Figure 4:
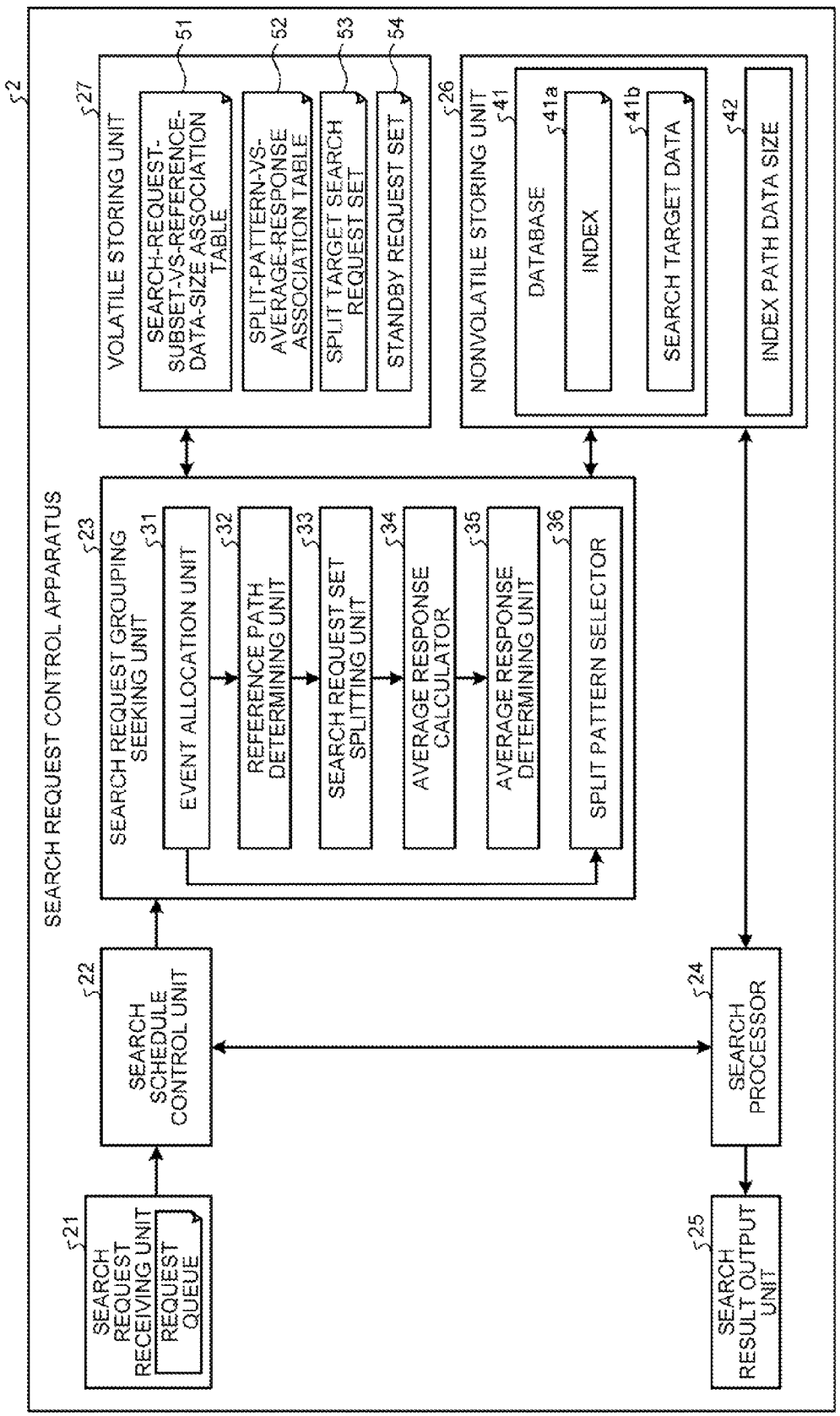
FIG. 4 is a functional block diagram illustrating a configuration of a search request control apparatus according to a second embodiment.

Configuration of a Search Request Control Apparatus According to a Second Embodiment FIG. 4 is a functional block diagram illustrating the configuration of a search request control apparatus according to a second embodiment. As illustrated in FIG. 4, a search request control apparatus 2 includes a search request receiving unit 21, a search schedule control unit 22, a search request grouping seeking unit 23, a search processor 24, a search result output unit 25, a nonvolatile storing unit 26, and a volatile storing unit 27.

The nonvolatile storing unit 26 includes an index path data size 42 and a database 41 that stores therein a search target data 41b and an index 41a that is needed to search for the search target data 41b. The index path data size 42 previously stores therein, for each path that constitutes the index 41a, the size of the data indicated by each path. The path mentioned here means a path that indicates data when referring to search target data. The nonvolatile storing unit 26 is, for example, a storing unit, such as a hard disk or an optical disk, or a nonvolatile semiconductor memory device such as a flash memory.

The volatile storing unit 27 includes a search-request-subset-vs-reference-data-size association table 51, a split-pattern-vs-average-response association table 52, a split target search request set 53, and a standby request set 54. The volatile storing unit 27 is, for example, a semiconductor memory device, such as a random access memory (RAM).

The search request receiving unit 21 receives a search request transmitted from an external application and inputs the received search request to a request queue.

The search schedule control unit 22 acquires an event that asynchronously occurs and controls, in accordance with the type of the acquired event, a search schedule of a search request. Specifically, when acquiring an arrival event of a search request from the search request receiving unit 21, the search schedule control unit 22 extracts a search request contained in the request queue and outputs the extracted search request to the search request grouping seeking unit 23, which will be described later. Furthermore, when acquiring a searched event of the search request from the search processor 24, which will be described later, the search schedule control unit 22 outputs, to the search request grouping seeking unit 23, an acquisition request of a search request set, search requests in which are to be processed collectively. Then, when acquiring an acquisition request set of the search request set from the search request grouping seeking unit 23, the search schedule control unit 22 outputs search requests contained in the acquired set to the search processor 24.

For the search requests that are almost simultaneously acquired from the search schedule control unit 22, the search request grouping seeking unit 23 seeks a split option that improves the average response. Furthermore, the search request grouping seeking unit 23 includes an event allocation unit 31, a reference path determining unit 32, a search request set splitting unit 33, an average response calculator 34, an average response determining unit 35, and a split pattern selector 36.

The event allocation unit 31 acquires an event and allocates a process in accordance with the type of the acquired event. Specifically, the event allocation unit 31 stores, as a search request set in the split target search request set 53, search requests that are almost simultaneously acquired from the search schedule control unit 22.

At this time, the split target search request set 53 stores therein a search request set that is to be split into a plurality of subsets. For example, the split target search request set 53 stores therein search requests contained in the search request set by associating the search requests with an identification number uniquely allocated to the search request set.

When acquiring an acquisition request of the search request set from the search schedule control unit 22, the event allocation unit 31 outputs the acquisition request to the split pattern selector 36 in order to select a split pattern of the search request set. Furthermore, if an event is not received in a predetermined time period after the most recent event is acquired, the event allocation unit 31 outputs a split request of the search request set to the reference path determining unit 32 in order to split the search request set stored in the split target search request set 53 into a plurality of subsets.

When receiving the split request of the search request set from the event allocation unit 31, the reference path determining unit 32 determines a path used for referring to data for each of the search requests contained in the search request set stored in the split target search request set 53. Then, for each of the search requests, the reference path determining unit 32 temporarily stores the determined path in the volatile storing unit 27. For example, the reference path determining unit 32 stores, for each path, the string of flags representing the reference availability for each of the search requests. Here, a value of the flag representing that reference is available is "1", whereas a value of the flag representing that reference is not available is "0".

The search request set splitting unit 33 splits a search request set containing search requests acquired in a predetermined time period into a plurality of subsets in accordance with the degree of overlap of data searched by the search requests. Specifically, the search request set splitting unit 33 splits search requests whose paths are determined by the reference path determining unit 32 into subsets in accordance with the degree of overlap of data indicated by paths to which the search requests refer. For example, the search request set splitting unit 33 groups search requests into the same subset, when the data indicated by reference paths of these search requests overlap by a predetermined rate. Furthermore, the search request set splitting unit 33 splits search requests into different subsets, when the data indicated by reference paths of these search requests do not overlap by the predetermined rate. A combination of the two split subsets forms a single split pattern. The predetermined rate mentioned here is, for example, 80% or 90%; however, it may also vary as needed. It is assumed, with respect to the two subsets that constitute a single split pattern, that a product set of the two is an empty set and the union of the two is the search request set.

Furthermore, the search request set splitting unit 33 calculates the size of the data to be referred to for each subset that is obtained by splitting the search request sets. Specifically, by using the string of flags for each search request, the search request set splitting unit 33 calculates the logical addition of the flags for each path, with respect to the search requests contained in the subsets. Here, it is assumed that the string of flags for each search request is stored in the volatile storing unit 27 by the reference path determining unit 32. Then, in accordance with the calculated value of the flags for each path, the search request set splitting unit 33 calculates the reference data size for each path by using the index path data size 42. Then, the search request set splitting unit 33 adds the calculated reference data sizes for respective paths and obtains the "reference data size of the search request subset".

Furthermore, the search request set splitting unit 33 associates the "reference data sizes of the search request subsets" with subsets and stores them in the search-request-subset-vs-reference-data-size association table 51. In the following, the data structure of the search-request-subset-vs-reference-data-size association table 51 will be described with reference to FIG. 5.

Figure 5:
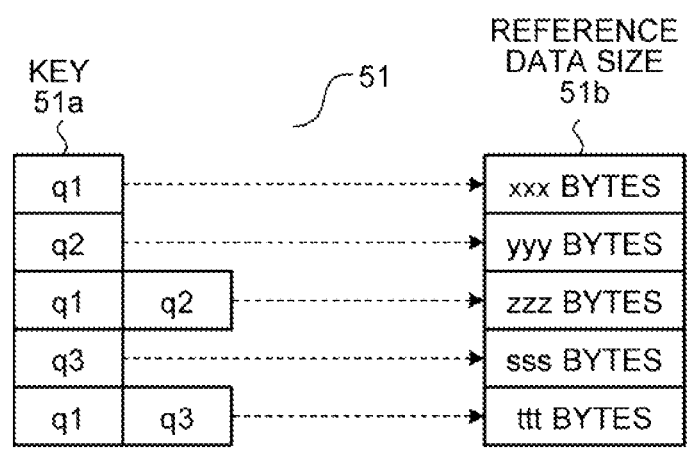
FIG. 5 is a schematic diagram illustrating an example of the data structure of a search-request-subset-vs-reference-data-size association table.

FIG. 5 is a schematic diagram illustrating an example of the data structure of the search-request-subset-vs-reference-data-size association table. As illustrated in FIG. 5, the search-request-subset-vs-reference-data-size association table 51 stores therein, in an associated manner, keys 51a and reference data sizes 51b. Specifically, the search-request-subset-vs-reference-data-size association table 51 has a map structure, such as a hash table, in which a value associated with the key 51a corresponds to the reference data size 51b. The key 51a indicates an identifier set of the search requests contained in the subset of the search requests. The reference data size 51b indicates the size of data to which the subset of the search requests refers.

Figure 6:
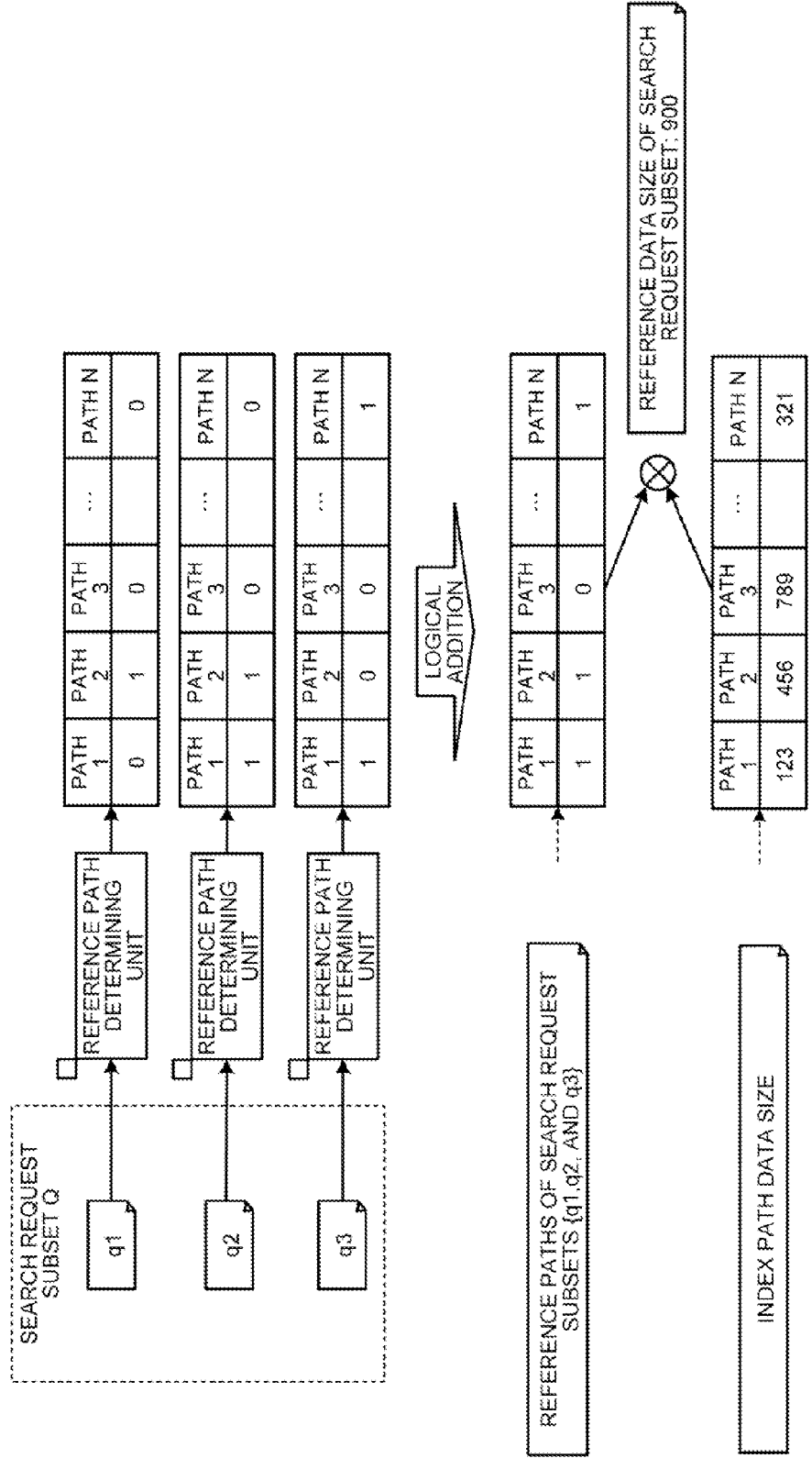
FIG. 6 is a schematic diagram illustrating a method for calculating a reference data size of a search request subset.

In the following, a method for calculating the size of data to which a subset of search requests (search request subset) refers will be described with reference to FIG. 6. FIG. 6 is a schematic diagram illustrating a method for calculating a reference data size of a search request subset. In FIG. 6, a method for calculating a reference data size of a search request subset Q will be described using an example case in which search requests q1 to q3 are contained in the search request subset Q. As illustrated in FIG. 6, in the string of flags of the search request q1, the path 2 is represented by "1" indicating that the path 2 is referred to, whereas paths other than the path 2 are represented by "0" indicating that these paths are not referred to. In the string of flags of the search request q2, the paths 1 and 2 are represented by "1" indicating that the paths 1 and 2 are referred to, whereas paths other than the paths 1 and 2 are represented by "0" indicating that these paths are not referred to. In the string of flags of the search request q3, the paths 1 and N are represented by "1" indicating that the paths 1 and N are referred to, whereas paths other than the paths 1 and N are represented by "0" indicating that these paths are not referred to.

By using the strings of flags of the search requests q1 to q3, the search request set splitting unit 33 calculates the logical addition of the flags for paths. Here, in the calculated strings of the flags for paths, the paths 1, 2, and N are represented by "1" indicating that the paths are referred to, whereas paths other than the path 1, 2, and N are represented by "0" indicating that these paths are not referred to. Then, the search request set splitting unit 33 calculates the inner product of the values of the calculated strings of the flags for paths and the data sizes for paths stored in the index path data size 42. Here, values of the calculated strings of the flags for paths are {1, 1, 0, . . . , and 1}, whereas the data sizes for the paths stored in the index path data size 42 are {123, 456, 789, . . . , and 321}. Accordingly, the products of the paths are {123, 456, 0, . . . , and 321}. Furthermore, the search request set splitting unit 33 adds the obtained data sizes of the paths in order to obtain a "reference data size of the search request subset". Here, the "reference data size of the search request subset" is "900".

Referring back to FIG. 4, in accordance with the processing order of the subsets that are obtained through splitting by the search request set splitting unit 33, the average response calculator 34 calculates the average responses of the search requests contained in the search request set. Specifically, the average response calculator 34 sequentially selects one split pattern from among the split patterns that are obtained through splitting by the search request set splitting unit 33. Then, the average response calculator 34 determines the processing order of the two subsets contained in the selected split pattern. Furthermore, the average response calculator 34 reads, from the search-request-subset-vs-reference-data-size association table 51, reference data sizes of search requests that are contained in a subset and that are to be processed first (hereinafter, referred to as a "first-order subset"). Then, in accordance with the read reference data sizes, the average response calculator 34 calculates a search time of the first-order subset. Furthermore, the average response calculator 34 reads, from the search-request-subset-vs-reference-data-size association table 51, reference data sizes of search requests that are contained in a subset and that are to be subsequently processed (hereinafter, referred to as a "second-order subset"). Then, in accordance with the read reference data sizes, the average response calculator 34 calculates a search time of the second-order subset.

Then, in accordance with the search time of the first-order subset and the search time of the second-order subset, the average response calculator 34 calculates the average response of the search requests contained in the search request set that is the union of the first-order subset and the second-order subset. For example, the search time of the first-order subset is represented by $r_1$, the search time of the second-order subset is represented by $r_2$, the number of search requests contained in the first-order subset is represented by $N_1$, and the number of search requests contained in the second-order subset is represented by $N_2$. Furthermore, the number of search requests contained in the search request set is represented by $N_0$. In other words, $N_0$ is a value obtained by adding $N_1$ and $N_2$. In this example, an average response $r_{12}$ of the search requests contained in the search request set is represented by Expression (3) below:

$$r_{12} = \{N_1 \times r_1 + N_2 \times (w_2 + r_2)\}/N_0 = r_1 + r_2 \times N_2/N_0 \quad (3)$$

where, $w_2$ is the waiting time of the second-order subset processed after the search process is performed on the first-order subset and is the same value as that of the search time $r_1$ of the first-order subset.

Furthermore, the average response calculator 34 associates the calculated average response of the search requests with the split pattern and stores them in the split-pattern-vs-average-response association table 52. In the following, the data structure of the split-pattern-vs-average-response association table 52 will be described with reference to FIG. 7.

Figure 7:
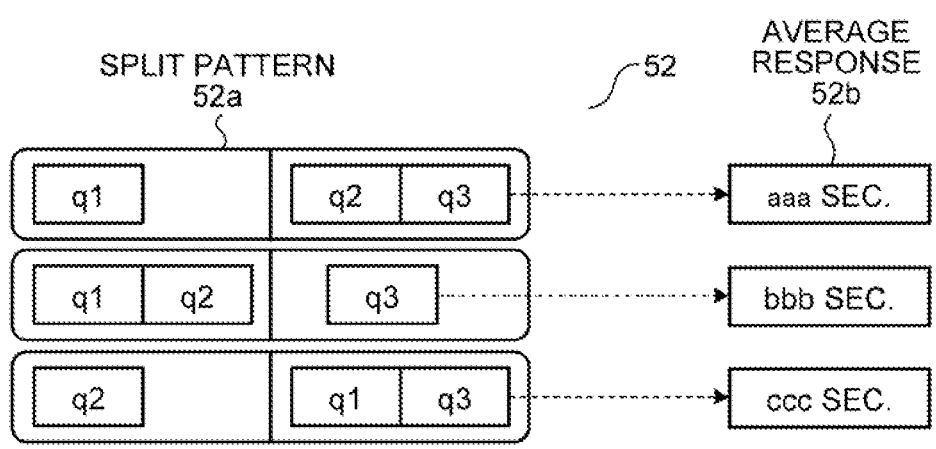
FIG. 7 is a schematic diagram illustrating an example of the data structure of a split-pattern-vs-average-response association table.

FIG. 7 is a schematic diagram illustrating an example of the data structure of the split-pattern-vs-average-response association table 52. As illustrated in FIG. 7, the split-pattern-vs-average-response association table 52 stores therein, in an associated manner, split patterns 52a and average responses 52b. Specifically, the split-pattern-vs-average-response association table 52 has a map structure, such as a B-Tree, in which the split patterns 52a are represented by keys, and the average responses 52b are represented by values. Each of the split patterns 52a indicates two subsets in accordance with the processing order. The two subsets are sets in which the product set is an empty set. Accordingly, the two subsets do not have search requests that overlap each other. The average response 52b indicates the average response of the search requests contained in two subsets indicated by the split pattern 52a.

The average response determining unit 35 determines whether the average response of the two subsets obtained by splitting the search request set is improved compared with the average response obtained by not splitting the search request set. Specifically, the average response determining unit 35 calculates the average response obtained when the search request set is not split. Then, for the split pattern whose average response is calculated by the average response calculator 34, the average response determining unit 35 determines whether this average response is shorter than the average response obtained when the search request set is not split. Then, if it is determined that the average response related to the split pattern obtained by splitting the search request set is shorter than that obtained by not splitting the search request set, the average response determining unit 35 determines that the average response is improved compared with a case in which the search request set is not split. In contrast, if it is determined that the average response related to the split pattern obtained by splitting the search request set is longer than that obtained by not splitting the search request set, the average response determining unit 35 determines that the average response is not improved compared with a case in which the search request set is not split.

Figure 8:
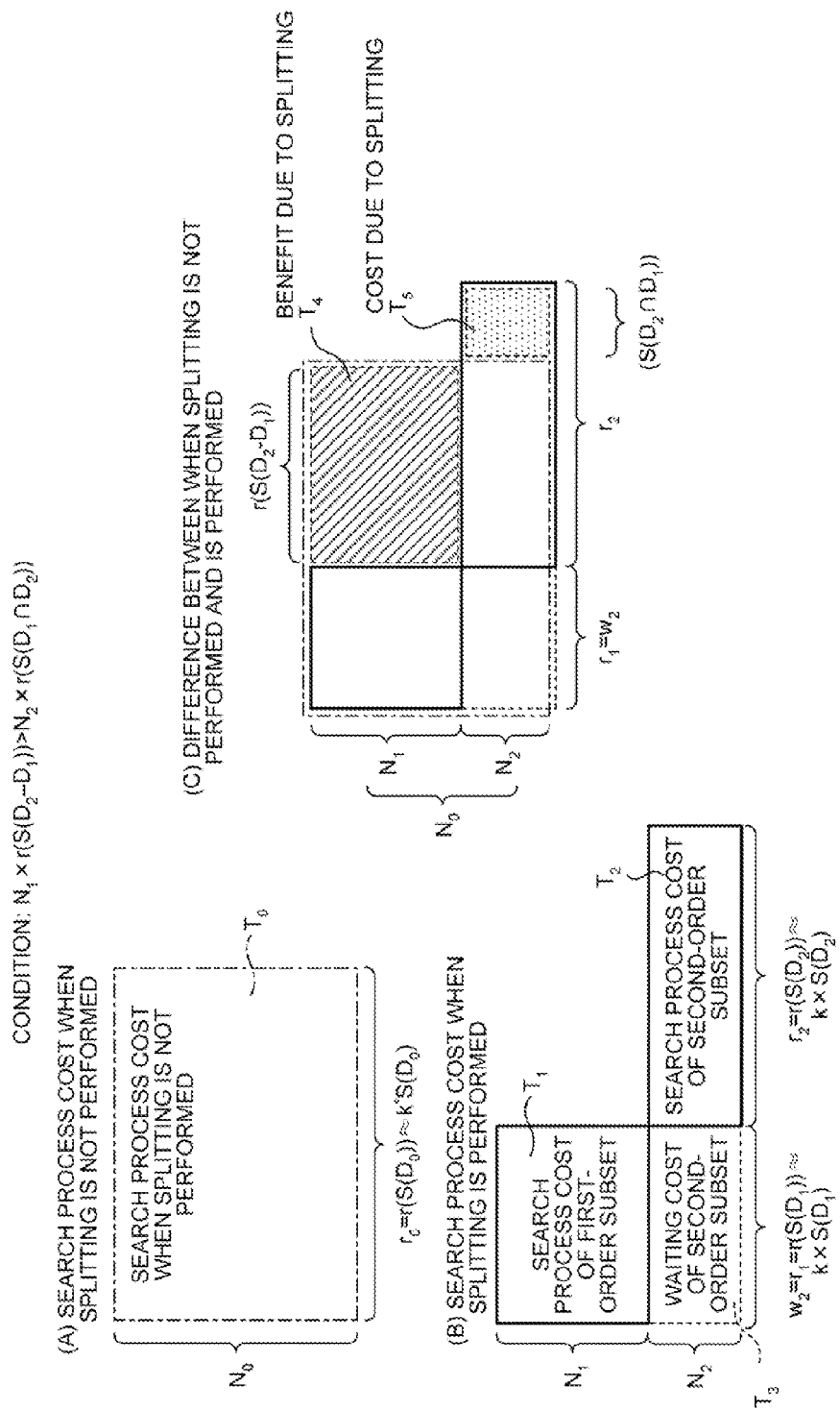
FIG. 8 is a schematic diagram illustrating a condition for improving an average response by splitting.

In the following, a condition to be satisfied in order to further improve an average response obtained by splitting a search request set compared with an average response obtained by not splitting a search request set will be described with reference to FIG. 8. FIG. 8 is a schematic diagram illustrating a condition for improving an average response by splitting. FIG. 8 illustrates, in portion (A), a search process cost when a search request set is not split. FIG. 8 illustrates, in portion (B), a search process cost obtained when a search request set is split. FIG. 8 illustrates, in portion (C), the difference between a case in which a search request set is not split and a case in which a search request set is split. In FIG. 8, the number of search requests contained in a search request set is represented by $N_0$, the number of search requests contained in a first-order subset is represented by $N_1$, and the number of search requests contained in a second-order subset is represented by $N_2$. Furthermore, all of the reference data contained in the search request set is represented by $D_0$, reference data contained in the first-order subset is represented by $D_1$, and reference data contained in the second-order subset is represented by $D_2$. Furthermore, $S(D_n)$ (n is 1 or 2) is the reference data size of reference data $D_n$ and $r(S(D_n))$ is the search time taken to search for the reference data size of the reference data $D_n$.

As illustrated in (A) of FIG. 8, the search process cost obtained when a search request set is not split is represented by the product of the number of search requests $N_0$ and the search time $r(S(D_0))$ taken to search for the reference data size $S(D_0)$ of all of the search requests contained in the search request set. Here, the region represented by $T_0$ corresponds to the search process cost. Specifically, with high-traffic technology, because search requests contained in a search request set are processed collectively, the search time is in proportion to the size of the reference data processed collectively, and the search process cost of the search request set can be obtained from the reference data size and the number of search requests.

As illustrated in portion (B) of FIG. 8, the search process cost obtained when search request set is split is represented by the sum of the search process cost of the first-order subset, the search process cost of the second-order subset, and the waiting cost of the second-order subset. The search process cost of the first-order subset is represented by the product of the number of search requests $N_1$ and the search time $r(S(D_1))$ (hereinafter, referred to as "$r_1$") taken to search for the reference data size $S(D_1)$ of the search requests contained in the first-order subset. Here, the region represented by $T_1$ corresponds to the search process cost of the first-order subset. The search process cost of the second-order subset is represented by the product of the number of search requests $N_2$ and search time $r(S(D_2))$ (hereinafter, referred to as "$r_2$") taken to search for the reference data size $S(D_2)$ of the search requests contained in the second-order subset. Here, the region represented by $T_2$ corresponds to the search process cost of the second-order subset. The waiting cost of the second-order subset is represented by the product of the number of search requests $N_2$ and the search time $r_1$ (hereinafter, referred to as "$w_2$") taken to search for the first-order subset that corresponds to the waiting time of the second-order subset for a search process. Here, the region represented by $T_3$ corresponds to the waiting cost of the second-order subset.

As illustrated in portion (C) of FIG. 8, the difference between a case in which splitting is performed and a case in which splitting is not performed corresponds to the difference between the "benefit due to splitting" $T_4$, where the search process cost is reduced due to splitting, and the "cost due to splitting" $T_5$, where the search process cost increases due to splitting. Here, the "benefit due to splitting" $T_4$ is represented by the product of the number of search requests $N_1$ contained in the first-order subset and the search time $r(S(D_2-D_1))$ taken to search for data obtained by subtracting reference data $D_1$ contained in the first-order subset from reference data $D_2$ contained in the second-order subset. Because of splitting, the "cost due to splitting" $T_5$ is represented by the product of the number of search requests $N_2$ contained in the second-order subset and the search time $r(S(D_2 \cap D_1))$ taken to search for data referred to by both the reference data $D_2$ contained in the second-order subset and the reference data $D_1$ contained in the first-order subset.

Accordingly, the difference $J_0$ between a case in which splitting is performed and a case in which splitting is not performed is represented by Expression (4) below by using the "benefit due to splitting" $T_4$ and the "cost due to splitting" $T_5$:

$$J_0 = T_4 - T_5 = N_1 \times r(S(D_2-D_1)) - N_2 \times r(S(D_2 \cap D_1)) \quad (4)$$

If the difference $J_0$ between a case in which splitting is performed and a case in which splitting is not performed is a positive value, i.e., if the "benefit due to splitting" $T_4$ is greater than the "cost due to splitting" $T_5$, the average response is improved due to splitting. Specifically, the degree of merit due to splitting increases as the "cost due to splitting" $T_5$ decreases, i.e., the data $S(D_2 \cap D_1)$ referred to by both the reference data $D_2$ in the second-order subset and the reference data $D_1$ in the first-order subset decreases. Furthermore, the degree of merit due to splitting further increases, as the data $S(D_2-D_1)$ that is referred to by the second-order subset and that is not referred to by the first-order subset increases.

The split pattern selector 36 selects a split pattern that has the minimum average response from among the split patterns whose average responses are determined to be further improved by the average response determining unit 35 compared with the average responses obtained when splitting is not performed. Specifically, when acquiring an acquisition request of a search request set from the event allocation unit 31, in accordance with the split-pattern-vs-average-response association table 52, the split pattern selector 36 selects a split pattern associated with the minimum average response. Then, the split pattern selector 36 outputs a first-order subset contained in the selected split pattern to the search schedule control unit 22 in order to perform the search process first. At this time, the split pattern selector 36 stores a second-order subset contained in the selected split pattern in the standby request set 54.

When a first-order subset contained in the split pattern in the search request set is previously subjected to the search process, the standby request set 54 stores therein a second-order subset that is subsequently subjected to the search process. For example, the standby request set 54 stores therein, in an associated manner, identification numbers uniquely allocated to search request sets and search requests contained in the second-order subset. If a second-order subset of the immediately previous search request set is already stored in the standby request set 54, the split pattern selector 36 outputs this second-order subset together with the first-order subset of the search request set, which is currently being processed, to the search schedule control unit 22. This is performed because these subsets are merged and processed by the search processor 24, which will be described later.

When acquiring the search requests contained in the subsets from the search schedule control unit 22, the search processor 24 performs a search process collectively, on the search requests via the database 41. Then, after the completion of the search process performed on the search requests contained in the subsets, the search processor 24 outputs searched events of the search requests to the search schedule control unit 22.

For subsets subjected to the search process by the search processor 24 collectively, the search result output unit 25 outputs the search results of the search requests contained in the subsets.

Flow of a Search Request Control Process According to the Second Embodiment

Figure 9:
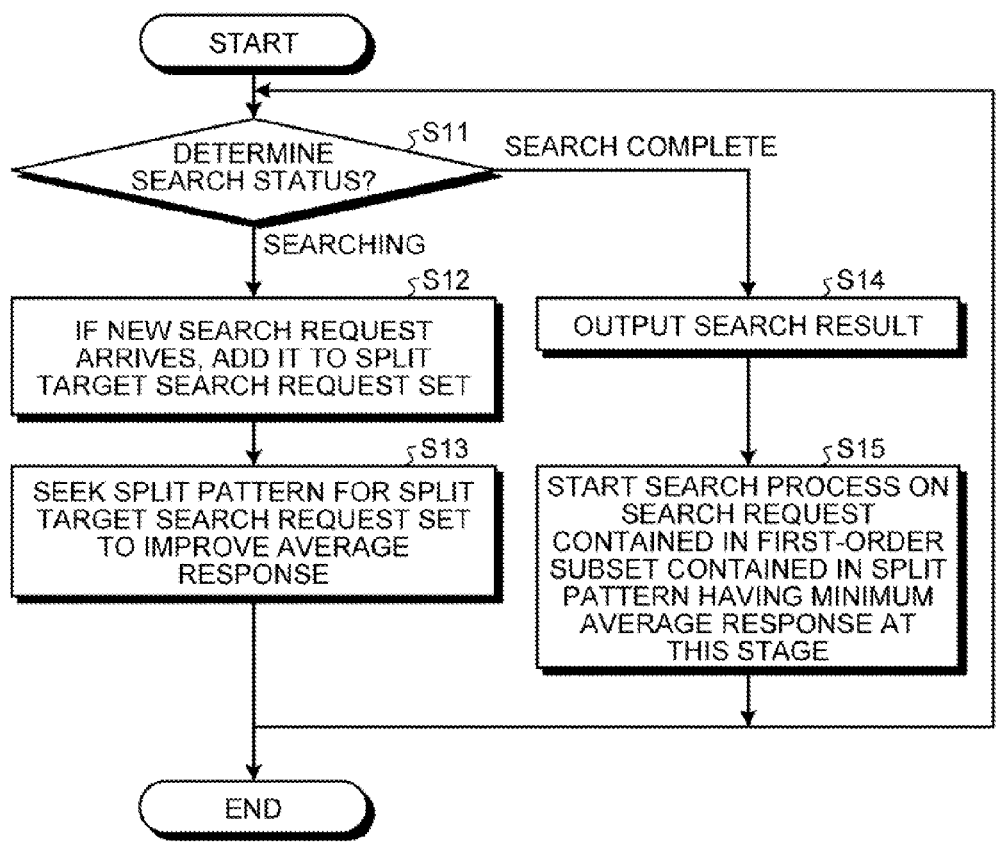
FIG. 9 is a flowchart illustrating a flow of a search request control process performed according to the second embodiment.

In the following, the flow of a search request control process will be described with reference to FIG. 9. FIG. 9 is a flowchart illustrating the flow of a search request control process performed by the second embodiment.

First, the search request control process determines the search status of search requests (Step S11). If it is determined that the search status of the search requests indicates that a search is in progress (searching at Step S11) and if a new search request arrives, the search request control process adds the new search request to a search request set that is to be split (Step S12). Specifically, while searching in accordance with search requests related to a search request set that arrives immediately before the arrival of a search request set containing the new search requests, the search request control process stores, as a search request set in the split target search request set 53, the new search requests that arrive during a predetermined time period, i.e., almost simultaneously. Then, the search request control process performs, on the search request set that is to be split and that is stored in the split target search request set 53, a split pattern seeking process in which the average response is improved (Step S13). Then, the search request control process proceeds to Step S11.

In contrast, if it is determined that the search status of the search requests indicates that a search is completed (search complete at Step S11), the search request control process outputs the search result (Step S14). Then, for the search request set stored in the split target search request set 53, the search request control process starts performing a search process on a first-order subset contained in a split pattern that has the minimum average response from among the split patterns that are sought at this stage (Step S15). Then, the search request control process proceeds to Step S11.

Flow of a Search Schedule Control Process

Figure 10:
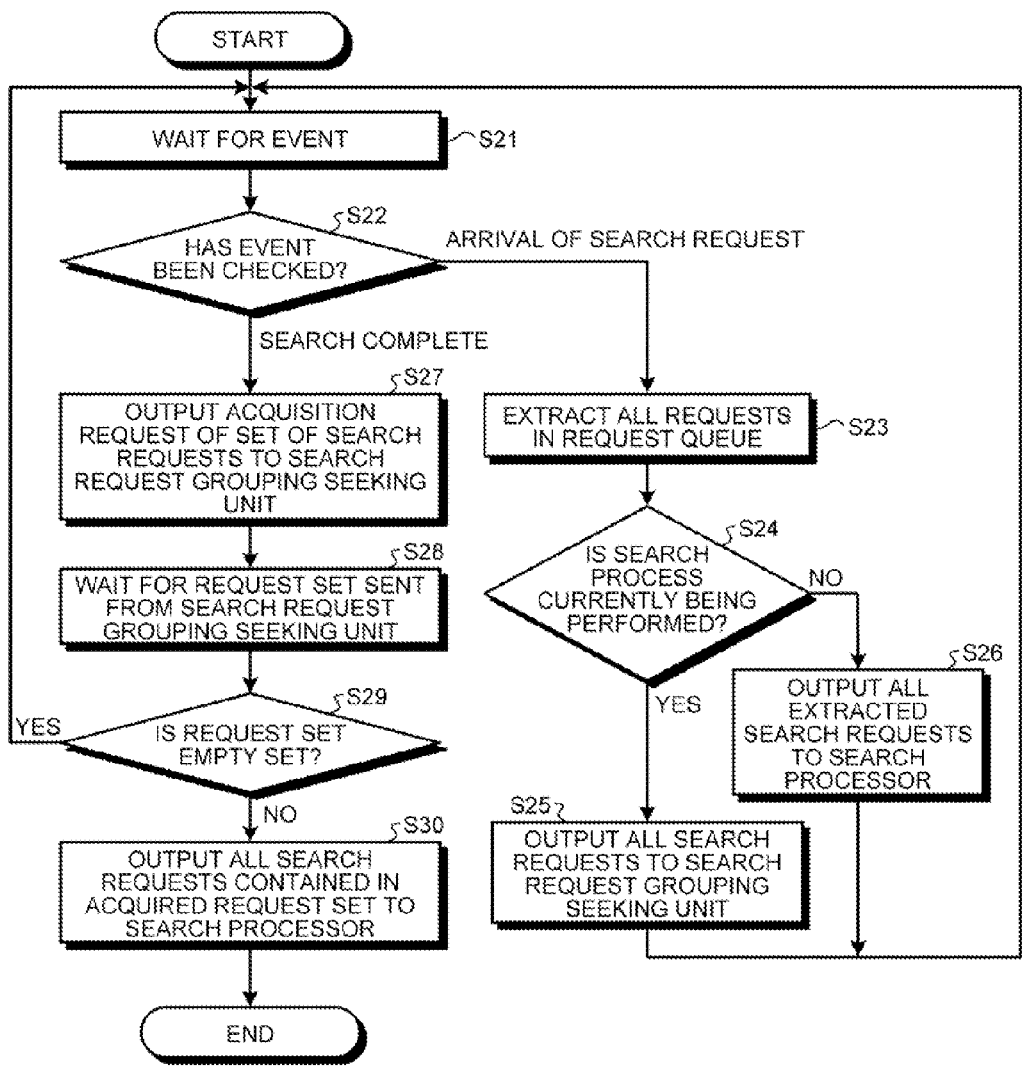
FIG. 10 is a flowchart illustrating a flow of a search schedule control process.

In the following, the flow of the search schedule control process performed by the search schedule control unit 22 will be described with reference to FIG. 10. FIG. 10 is a flowchart illustrating the flow of a search schedule control process.

Firstly, the search schedule control unit 22 waits for an event (Step S21), and when acquiring an event, the search schedule control unit 22 checks the acquired event (Step S22).

If it is determined that the acquired event is an arrival event indicating that a search request has arrived (arrival of search request at Step S22), the search schedule control unit 22 extracts search request which is input to a request queue (Step S23). Then, the search schedule control unit 22 determines whether the search process is currently being performed on the search requests (Step S24). If it is determined that the search process is currently being performed on the search requests (Yes at Step S24), the search schedule control unit 22 outputs all of the search requests to the search request grouping seeking unit 23 in order to split all of the search requests extracted from the request queue (Step S25). Then, the search schedule control unit 22 proceeds to Step S21.

In contrast, if it is determined that the search process is not currently being performed on the search requests (No at Step S24), the search schedule control unit 22 outputs all of the search requests to the search processor 24 in order to perform the search process on all of the search requests extracted from the request queue (Step S26). Then, the search schedule control unit 22 proceeds to Step S21.

In contrast, if the acquired event is a searched event of the search requests (search complete at Step S22), the search schedule control unit 22 outputs an acquisition request of a set of search requests to the search request grouping seeking unit 23 in order to receive search requests that are to be subsequently searched (Step S27). Then, the search schedule control unit 22 waits for a set of search requests sent from the search request grouping seeking unit 23 (Step S28).

When acquiring the set of search requests from the search request grouping seeking unit 23, the search schedule control unit 22 determines whether the acquired set is an empty set (Step S29). If it is determined that the acquired set is an empty set (Yes at Step S29), the search schedule control unit 22 proceeds to Step S21 in order to wait for the subsequent event. In contrast, if it is determined that the acquired set is not an empty set (No at Step S29), the search schedule control unit 22 outputs the search requests contained in the acquired set to the search processor 24 (Step S30).

Flow of a Search Request Grouping Seeking Process

Figure 11:
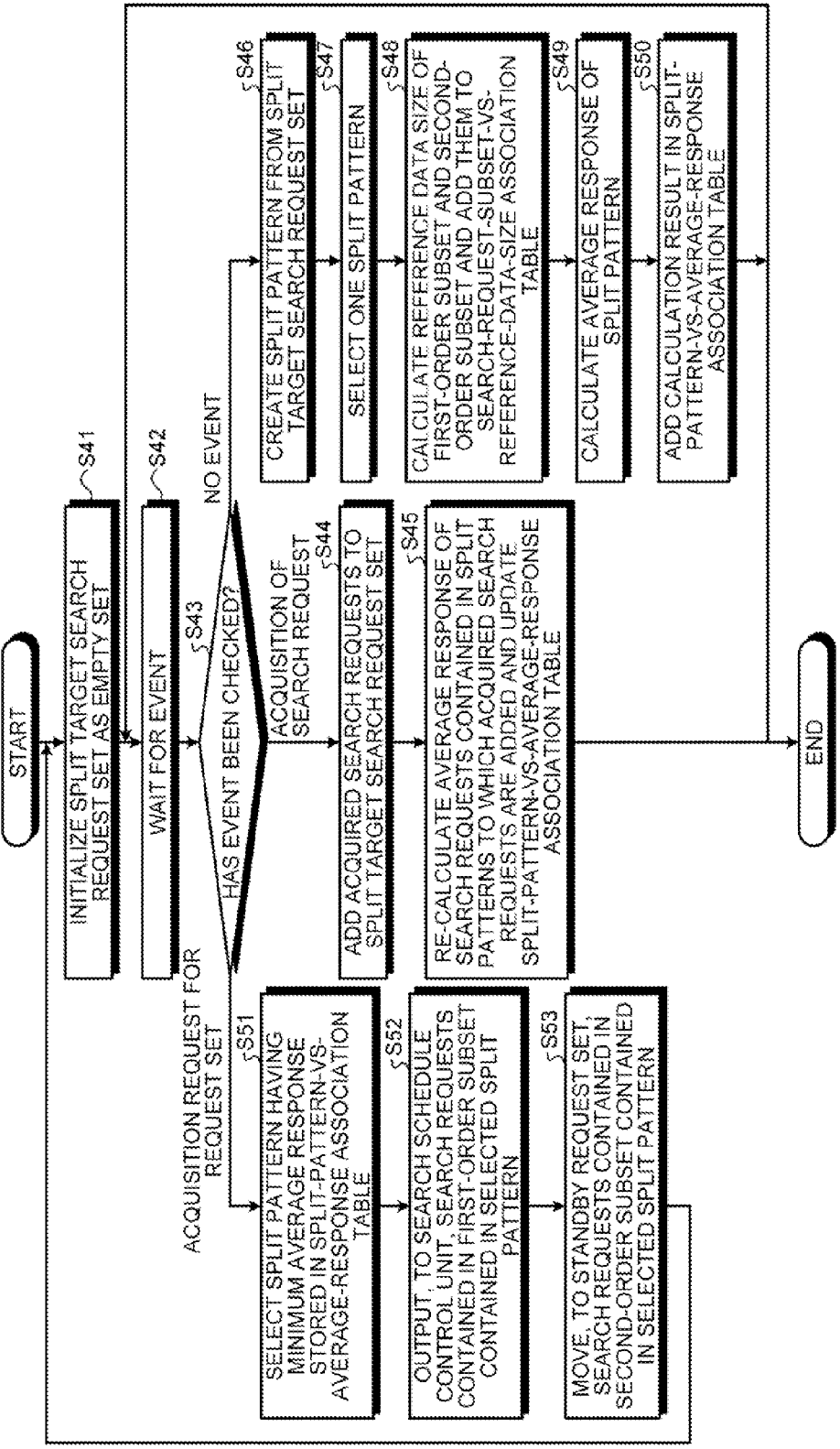
FIG. 11 is a flowchart illustrating a flow of a search request grouping seeking process.

In the following, a search request grouping seeking process performed by the search request grouping seeking unit 23 will be described with reference to FIG. 11. FIG. 11 is a flowchart illustrating the flow of a search request grouping seeking process.

First, the search request grouping seeking unit 23 initializes the split target search request set 53 as an empty set (Step S41). Then, the event allocation unit 31 in the search request grouping seeking unit 23 waits for an event (Step S42), and checks the acquired event when acquiring the event (Step S43).

If the event allocation unit 31 determines that the acquired event is an event indicating that search requests are acquired (acquisition of search requests at Step S43), the event allocation unit 31 adds the acquired search requests to the split target search request set 53 (Step S44). Specifically, the event allocation unit 31 stores the acquired search requests as a search request set in the split target search request set 53.

Then, the average response calculator 34 re-calculates the average response of search requests in split patterns to which the acquired search requests are added; updates the calculation results associated with the split pattern; and stores them in the split-pattern-vs-average-response association table 52 (Step S45). Then, the average response calculator 34 proceeds to Step S42.

Furthermore, if the event allocation unit 31 determines that an event is not acquired in a predetermined time period after acquiring the immediately previous event (no event at Step S43), the search request set splitting unit 33 creates a split pattern from a search request set of the split target search request set 53 (Step S46). Specifically, in accordance with the degree of overlap of the data searched by each search request, the search request set splitting unit 33 splits the search request set into two subsets and creates a split pattern. For example, the search request set splitting unit 33 groups, into the same subset, the search requests in which data that are indicated by reference paths and that are overlapped by a predetermined rate. Furthermore, the search request set splitting unit 33 splits search requests that are not overlapped by the predetermined rate into subsets that are different from the subset mentioned above and treats a combination of these subsets as a single split pattern.

Subsequently, the search request set splitting unit 33 selects a single created split pattern (Step S47). Then, for each subset contained in the selected split pattern, the search request set splitting unit 33 calculates the size of data to be referenced and adds it to the search-request-subset-vs-reference-data-size association table 51 (Step S48).

Thereafter, in accordance with the processing order of the two subsets contained in the selected split pattern, the average response calculator 34 calculates the average response of the search requests contained in the search request set (Step S49). Specifically, the average response calculator 34 determines the processing order of the two subsets contained in the split pattern and reads, from the search-request-subset-vs-reference-data-size association table 51, reference data sizes of a first-order subset that is processed first and a second-order subset that is subsequently processed. Then, in accordance with the reference data sizes of the read first-order subset and the second-order subset, the average response calculator 34 calculates a search time for each data. Furthermore, in accordance with the search times for the first-order subset and the second-order subset, the average response calculator 34 calculates the average response of the search requests contained in the search request set.

Then, the average response calculator 34 associates the calculated average response with the split pattern, adds it to the split-pattern-vs-average-response association table 52 (Step S50), and proceeds to Step S42.

Furthermore, if the event allocation unit 31 determines that the acquired event is an event indicating an acquisition request for a set of search requests (acquisition request for request set at Step S43), the split pattern selector 36 selects the split pattern that has the minimum average response (Step S51). Specifically, in accordance with the split-pattern-vs-average-response association table 52, the split pattern selector 36 selects a split pattern associated with the minimum average response.

Then, the split pattern selector 36 outputs, to the search schedule control unit 22, the search requests contained in the first-order subset contained in the selected split pattern so as to be subjected to the search process first (Step S52). At this stage, the split pattern selector 36 moves, to the standby request set 54, the search requests contained in the second-order subset contained in the selected split pattern (Step S53). Then, the split pattern selector 36 proceeds to Step S41. Furthermore, if a second-order subset of the immediately previous search request set is already stored in the standby request set 54, the split pattern selector 36 outputs this second-order subset together with a first-order subset of a search request set, which is currently being processed, to the search schedule control unit 22.

Advantage of the Second Embodiment

According to the second embodiment, the search request set splitting unit 33 splits a search request set containing search requests that are almost simultaneously acquired into a plurality of subsets in accordance with the degree of overlap of data searched by the search requests. Then, in accordance with the processing order of the subsets that are split by the search request set splitting unit 33, the average response calculator 34 calculates the average response of the search requests contained in the search request set. Furthermore, for subsets having the minimum average response calculated by the average response calculator 34, the search processor 24 processes collectively the search requests contained in the subsets in accordance with the processing order.

With this configuration, the search request set splitting unit 33 uses the degree of overlap of data searched by the search requests to split a search request set into subsets, the subset being a unit of collective processing. Accordingly, the search request set splitting unit 33 enhances the locality of data searched by a subset, thus improving the data search efficiency. Furthermore, because the search request set splitting unit 33 splits the search request set into subsets in order to further reduce the average response of search requests, the average response of the search requests can be improved by processing each of the split subsets.

Furthermore, according to the second embodiment, the search request set splitting unit 33 splits a search request set into subsets while processing search requests related to a search request set that is acquired immediately before the search request set is acquired. Then, in accordance with the processing order of the subsets that are split by the search request set splitting unit 33, the average response calculator 34 calculates the average response of the search requests contained in the search request set. With this configuration, for a subsequent search request set that is to be processed after the completion of a process performed on the search request set that is acquired immediately before the subsequent search request set is acquired, it is possible to select a subset having a shorter average response, thus improving the average response of all of the search requests.

Furthermore, according to the second embodiment, the search processor 24 processes search requests contained in a subset, which is processed first, after processing search requests that are acquired immediately before the search request set is acquired. Then, the search processor 24 merges search requests contained in a subset, which is subsequently processed, with search requests acquired immediately after the search request set is acquired. With this configuration, the search processor 24 merges the subset to be processed first with search requests that are acquired immediately after the search request set. Accordingly, because the search processor 24 does not postpone a process performed on the subset that is subsequently processed, thus the average response of search request sets containing the subsets is reliably improved.

Furthermore, according to the second embodiment, the search-request-subset-vs-reference-data-size association table 51 stores therein the sizes of data searched by search requests collectively for each subset contained in a subset. Then, the average response calculator 34 calculates the average response by using the search time taken to search for data having a data size related to a subset that is processed first and the search time taken to search for data having a data size related to a subset that is subsequently processed. With this configuration, if the data related to the subset that is processed first does not overlap with the data related to the subset that is subsequently processed, the average response calculator 34 needs only the search time for searching data related to each of the data sizes related to the subsets. Accordingly, with the average response calculator 34, when compared with a case where a search request set is not split, the search time can be reduced, thus improving the average response.

For the second embodiment, a description has been given with the assumption that the split pattern selector 36 selects a split pattern associated with the minimum average response in accordance with the split-pattern-vs-average-response association table 52. However, if the minimum average response associated with a split pattern is longer than the average response obtained when splitting is not performed, the split pattern selector 36 may also select a search request set that is not split. In such a case, the average response calculator 34 associates search request sets with average responses of search requests obtained when splitting is not performed and stores them in the split-pattern-vs-average-response association table 52. Then, the split pattern selector 36 may also selects the minimum split pattern of average responses including the average response of search requests obtained when splitting is not performed. Accordingly, the split pattern selector 36 can make the average response stable because the average response is not longer than that of the search requests obtained when splitting is not performed.

Furthermore, according to the second embodiment, a description has been given with the assumption that the split pattern selector 36 splits a search request set containing a plurality of search requests acquired in a predetermined time period into two subsets in accordance with the degree of overlap of data searched by each search request. However, the split pattern selector 36 may also split a search request set containing search requests acquired in a predetermined time period into three subsets in accordance with the degree of overlap of data searched by each search request.

Program, etc.

Furthermore, the search request control apparatus 2 can be implemented by installing the functions of the units described above, such as the search schedule control unit 22 and the search request grouping seeking unit 23, in an information processing apparatus, such as an already known personal computer and a workstation.

The components of each unit illustrated in the drawings are not always physically configured as illustrated in the drawings. In other words, the specific shape of a separate or integrated unit is not limited to the drawings; however, all or part of the unit can be configured by functionally or physically separating or integrating any of the units depending on various loads or use conditions. For example, the average response calculator 34 may be integrated with the average response determining unit 35 as a single unit. In contrast, the average response calculator 34 may be separated by dividing it into a sorting unit that sorts therein the processing order of subsets and a calculator that calculates the average response of the subsets whose processing orders are sorted. Furthermore, a storing unit, such as the nonvolatile storing unit 26, may be connected via a network as an external unit of the search request control apparatus 2.

The various processes described in the embodiments can be implemented by a program prepared in advance and executed by a computer system such as a personal computer or a workstation. Accordingly, in the following, a computer that executes a search request control program having the same function as that performed by the search request control apparatus 2 illustrated in FIG. 4 will be described as an example with reference to FIG. 12.

Figure 12:
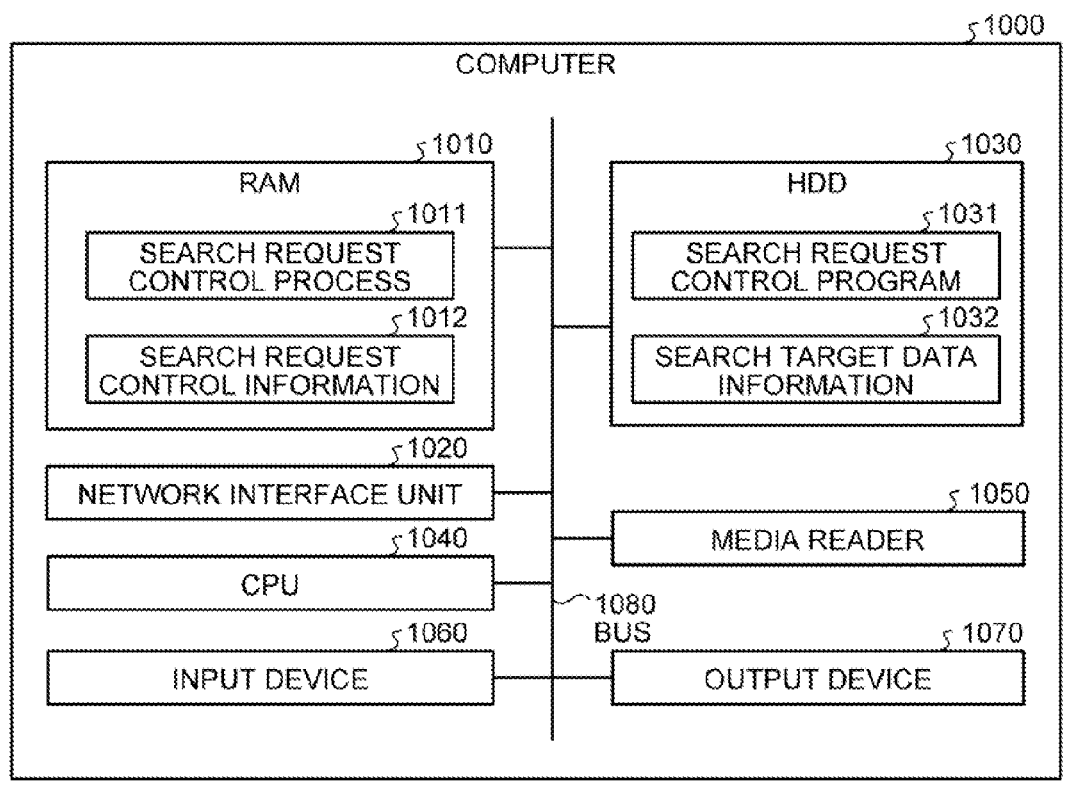
FIG. 12 is a block diagram illustrating a hardware configuration of a computer that executes a search request control program.
Figure 13:
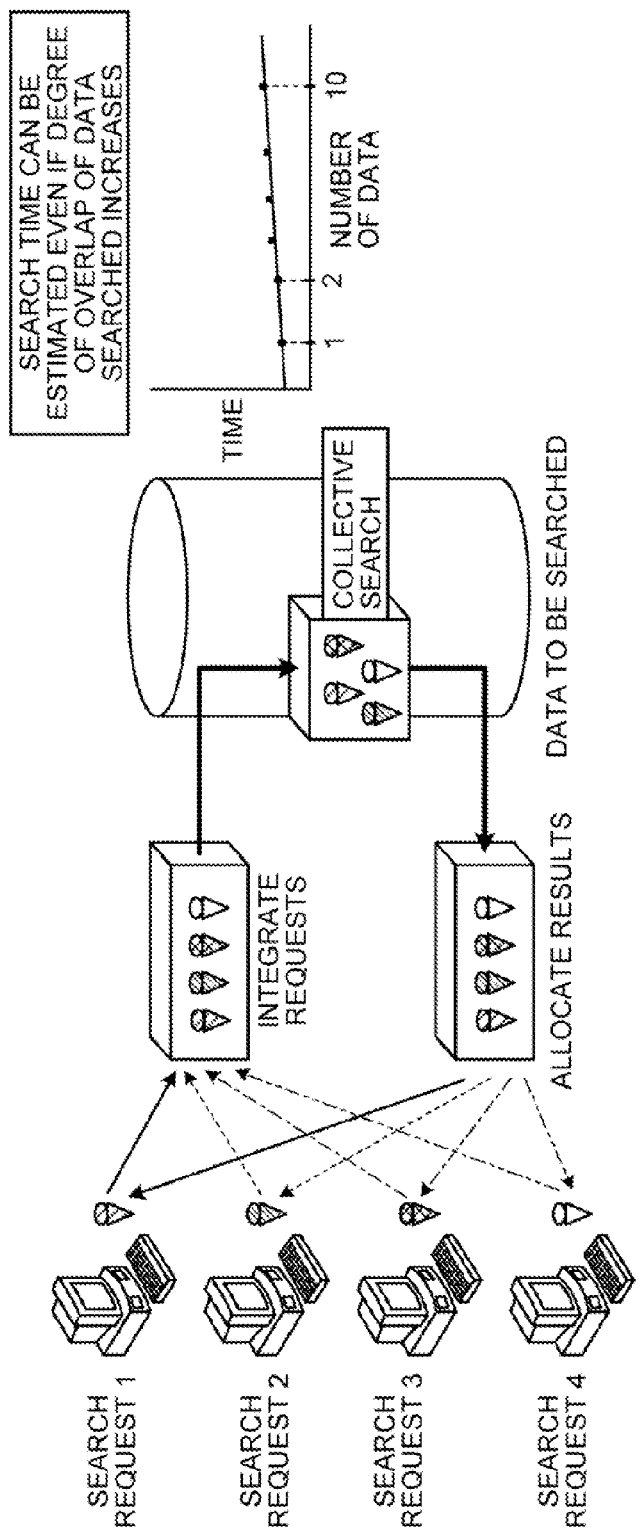
FIG. 13 is a schematic diagram illustrating a high-traffic technology.
Figure 14:
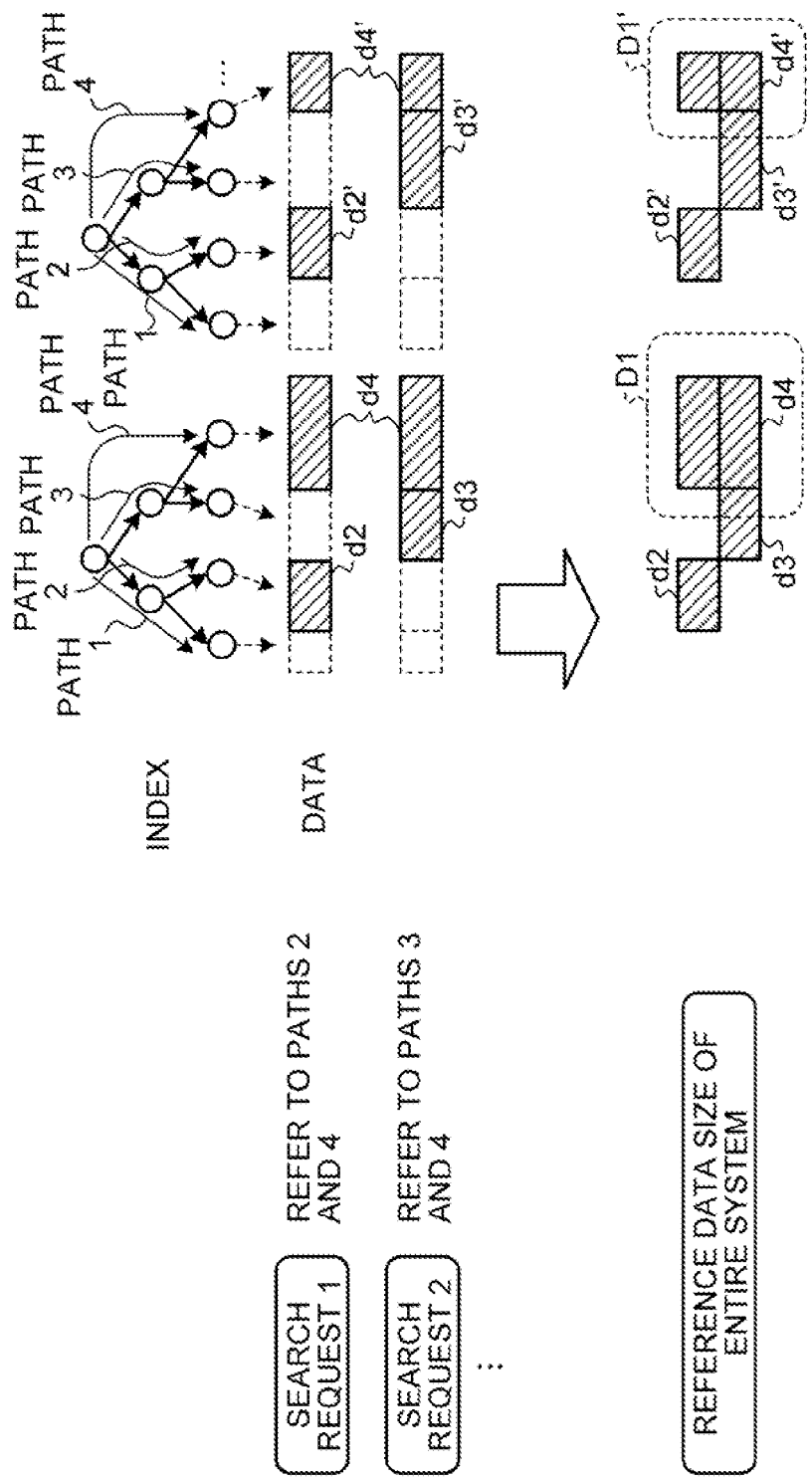
FIG. 14 is a schematic diagram illustrating an index technology.
Figure 15:
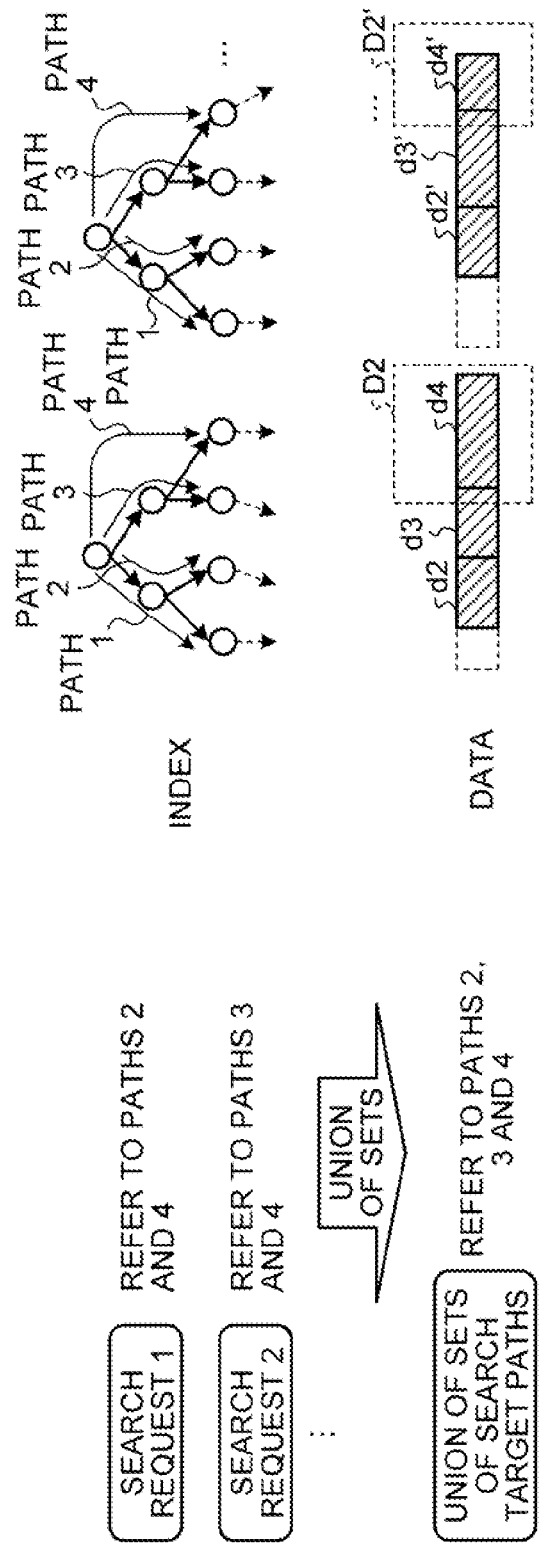
FIG. 15 is a schematic diagram illustrating a technology that adapts the index technology for the high-traffic technology.

FIG. 12 is a block diagram illustrating the hardware configuration of a computer that executes a search request control program. As illustrated in FIG. 12, a computer 1000 includes a random access memory (RAM) 1010, a network interface unit 1020, an HDD 1030, a central processor (CPU) 1040, a media reader 1050, an input device 1060, and an output device 1070. The RAM 1010, the network interface unit 1020, the HDD 1030, the CPU 1040, the input device 1060, and the output device 1070 are connected by a bus 1080.

The HDD 1030 stores therein a search request control program 1031 having the same function as that performed by the search request control apparatus 2 illustrated in FIG. 4. Furthermore, the HDD 1030 stores therein a search target data information 1032 that corresponds to information (the database 41 and the index path data size 42) stored in the nonvolatile storing unit 26 illustrated in FIG. 4.

The CPU 1040 reads the search request control program 1031 from the HDD 1030 and loads it in the RAM 1010, and thus the search request control program 1031 functions as a search request control process 1011. Then, the search request control process 1011 appropriately loads, in an area of the RAM 1010 appropriately allocated to the search request control process 1011, information or the like that is read from the search target data information 1032 and executes various data processes on the basis of the loaded data, such as a search request control information 1012.

Even when the search request control program 1031 is not stored in the HDD 1030, the media reader 1050 reads the search request control program 1031 from another medium or the like that stores therein the search request control program 1031. Examples of the media reader 1050 include a CD-ROM or an optical disk.

The network interface unit 1020 is connected to an external unit via a network in a wired or wireless manner. Examples of the input device 1060 include a keyboard and a mouse. An example of the output device 1070 includes a display.

The search request control program 1031 may also be stored in another computer (or a server) connected to the computer 1000 via a public circuit, the Internet, a local area network (LAN), a wide area network (WAN), or the like. In such a case, the computer 1000 reads and executes the search request control program 1031 from the above.

According to an aspect of an embodiment of the search request control apparatus disclosed in the present invention, data search efficiency can be improved when an index technology is adapted for high-traffic technology.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A search request control apparatus comprising:
a processor; and
a memory, wherein the processor executes:
splitting a search request set, which contains a plurality of search requests acquired in a predetermined period, into subsets by grouping search requests into same subset when a degree of overlap of data searched by each of search requests is more than a predetermined rate and splitting search requests into different subsets when a degree of overlap of data searched by each of search requests is less than the predetermined rate;
calculating an average response of the search requests contained in the search request set in accordance with a processing order of the subsets that are obtained through the splitting; and
processing collectively in accordance with the processing order, search requests contained in a plurality of subsets having a minimum average response calculated.

2. The search request control apparatus according to claim 1, wherein the splitting includes splitting the search request set into subsets while processing search requests related to another search request set that is acquired immediately before the search request set is acquired.

3. The search request control apparatus according to claim 1, wherein the processing includes processing, after processing search requests acquired immediately before the search request set is acquired, search requests contained in a subset whose processing order is first-order and merges search requests contained in a subset whose processing order is second-order with search requests acquired immediately after the search request set is acquired.

4. The search request control apparatus according to claim 1, wherein the processor further includes:
storing a size of data searched collectively by the search requests contained in each of the subsets, wherein
the calculating includes calculating the average response by using a search time taken to search for data having a data size related to a subset whose processing order is first-order and a search time taken to search for data having a data size related to a subset whose processing order is second-order.

5. A computer readable, non-transitory medium having stored therein a search request control program causing a computer to execute a process comprising:
splitting a search request set, which contains a plurality of search requests acquired in a predetermined period, into subsets by grouping search requests into same subset when a degree of overlap of data searched by each of search requests is more than a predetermined rate and splitting search requests into different subsets when a degree of overlap of data searched by each of search requests is less than the predetermined rate;
calculating an average response of the search requests contained in the search request set in accordance with a processing order of the subsets that are obtained at the splitting; and
processing, using a processor, collectively in accordance with the processing order, search requests contained in a plurality of subsets having a minimum average response calculated at the calculating.

6. A search request control method for controlling search requests by a search request control apparatus, the search request control method comprising:
splitting a search request set, which contains a plurality of search requests acquired in a predetermined period, into subsets by grouping search requests into same subset when a degree of overlap of data searched by each of search requests is more than a predetermined rate and splitting search requests into different subsets when a degree of overlap of data searched by each of search requests is less than the predetermined rate;
calculating an average response of the search requests contained in the search request set in accordance with a processing order of the subsets that are obtained at the splitting; and
processing, using a processor, collectively in accordance with the processing order, search requests contained in a plurality of subsets having a minimum average response calculated at the calculating.

* * * * *